March 6, 1956     HENRI-GEORGES DOLL     2,736,967
INDUCTION CALIPER
Filed Feb. 9, 1952     2 Sheets—Sheet 1
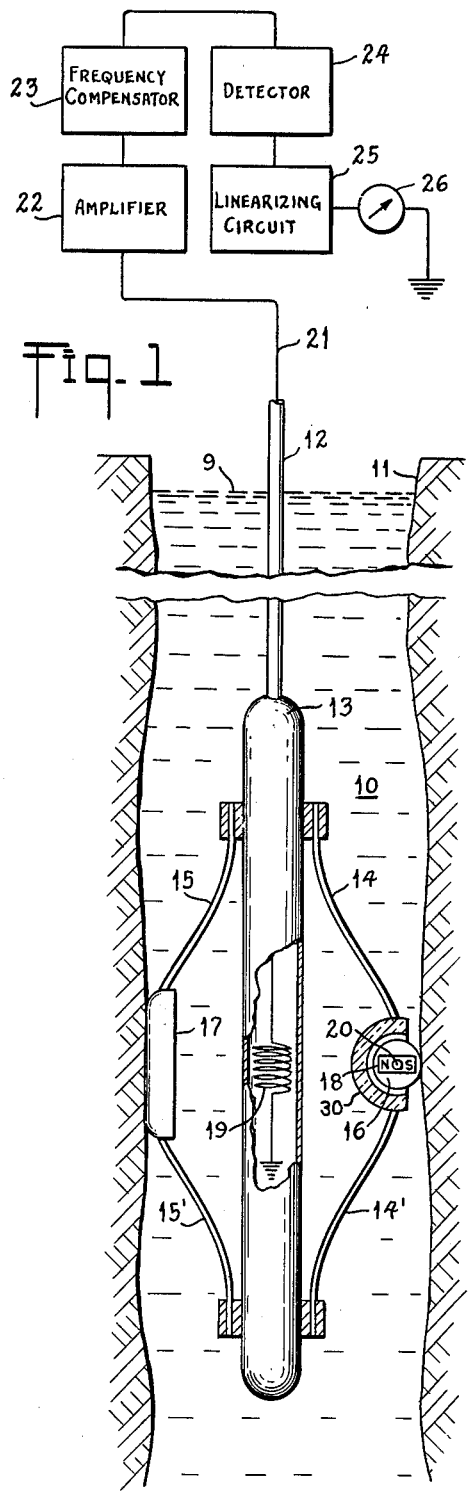
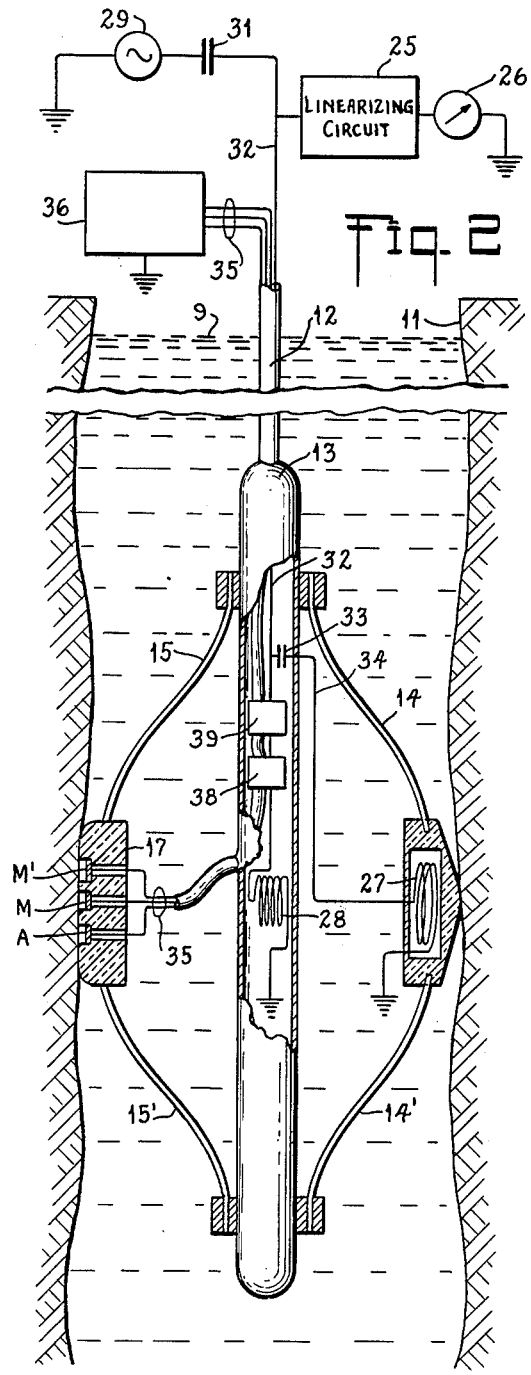
INVENTOR.
HENRI-GEORGES DOLL
BY Campbell, Brumbaugh, Free & Graves
HIS ATTORNEYS

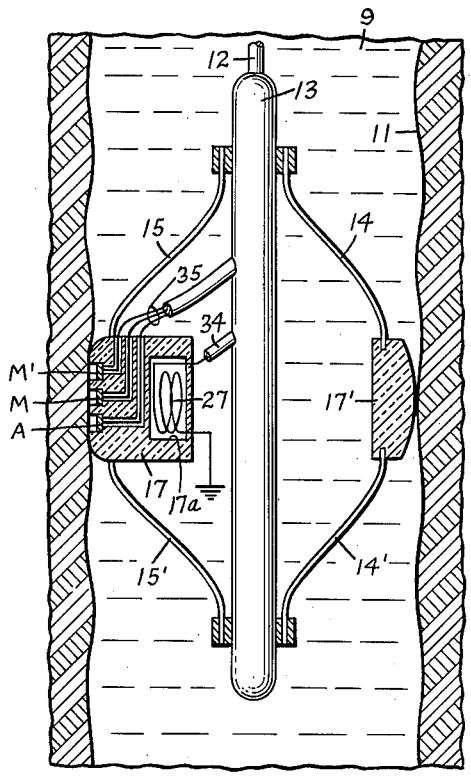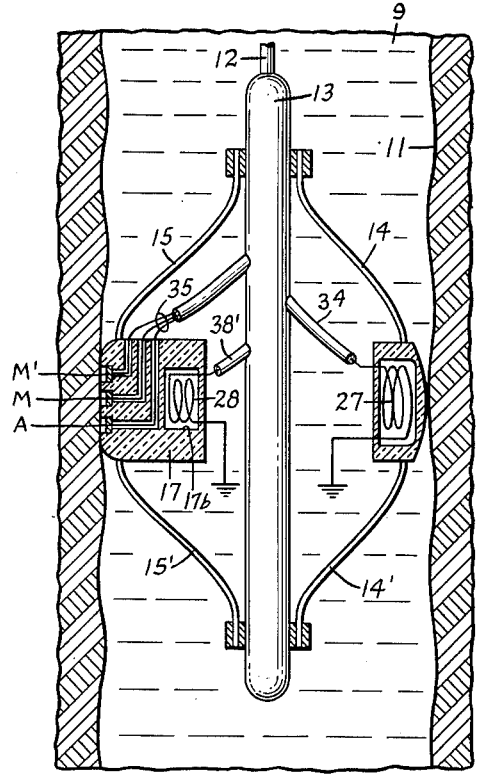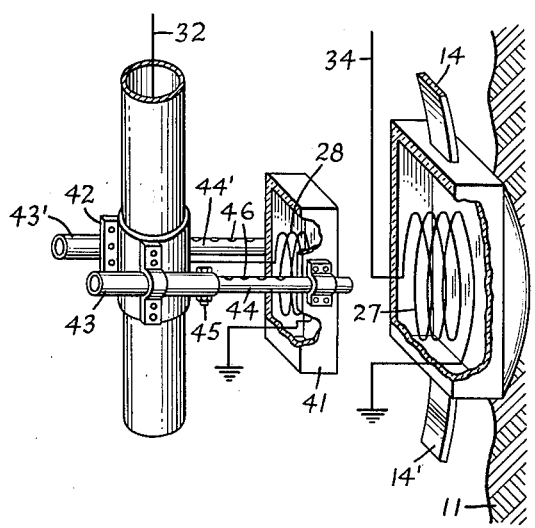

United States Patent Office 2,736,967
Patented Mar. 6, 1956

2,736,967

INDUCTION CALIPER

Henri-Georges Doll, Ridgefield, Conn., assignor to Schlumberger Well Surveying Corporation, Houston, Tex., a corporation of Delaware Application February 9, 1952, Serial No. 270,873

13 Claims. (Cl. 33—178)

This invention relates to borehole calipering devices, and, more particularly, to apparatus for measuring the diameter or cross-sectional area of boreholes drilled into the earth and recording at the earth's surface the measurement as a function of depth in the borehole.

Prior calipering devices generally comprise a mechanical leverage system actuated by arms which are supported by a central housing and urged against the side wall of the borehole. The leverage system usually cooperates with electrical elements enclosed in the central housing and including further movable members, such as sliding contacts, for example. The electrical elements communicate the movements of the arms to the surface in the form of electrical signals. These calipering devices are usually constructed as individual instruments performing their sole function during a separate trip in the borehole.

It is highly advantageous to run a caliper log simultaneously with other types of logs thereby eliminating the need for an additional separate run when the well casing is about to be cemented and the volume of material required must be determined. Furthermore, if the caliper log is recorded on the same film as the logs from the other instruments, more accurate interpretation of these latter logs is possible. It is well known, for example, that variations in the borehole diameter may give anomalous readings in an electrical log, particularly when detailed measurements are sought.

Calipers utilizing mechanical leverage systems and movable electrical elements may be rendered inoperative by mud leakage under high pressure through the necessary openings in the housing accommodating the moving elements.

Accordingly, it is an object of the present invention to provide a simplified calipering instrument for use in logging boreholes.

Another object of the invention is to provide a calipering instrument that is readily adapted for simultaneous operation with ordinary well logging instruments and may be incorporated with the latter without radical alteration in the design of such instruments.

It is a particular object of the invention to provide an electrical calipering instrument for boreholes which avoids the use of complicated leverage systems and moving electrical contacts, is rugged, and is able to withstand the high temperatures and high pressures encountered in boreholes.

The objects of the invention are attained by providing transmitting means for generating a magnetic field and receiving means, in the form of a coil, for generating an electrical signal induced in response to changes in the apparent intensity of the magnetic field. The transmitting and receiving means are arranged to be spaced apart in a direction transverse to the axis of the borehole an amount which varies linearly with variation in the diameter of the borehole. One of the transmitting and receiving means is supported by a first member that is adapted to be resiliently urged against the wall of the borehole, while the other of the transmitting and receiving means is supported by a second member which may be a housing centralized in the borehole or may be similar to the first member and resiliently urged against the wall of the borehole diametrically opposite the first member.

The instantaneous voltage induced in the receiving means is dependent upon the rate of change of the magnetic flux linking the receiving means. Accordingly, if the magnetic field is constant, the instantaneous induced voltage is a function of the rate of change of the spacing between the transmitting and receiving means. This voltage may be indicated as a measure of the roughness of the wall of the borehole. Preferably, however, the magnetic field is made to fluctuate or alternate more or less periodically and in this case the effective voltage induced in the receiving means is a function of the separation of the transmitting and receiving means. An indicator outside the borehole responds to the electrical signal induced in the receiving means and may be interpreted in terms of the diameter, radius or cross-sectional area of the borehole.

The magnetic field generating means may comprise a permanent magnet which is arranged to be oscillated, reciprocated or rotated by movement of the housing through the borehole causing fluctuation of the magnetic field. Alternatively, the magnetic field generating means may take the form of a small transmitting coil which establishes an alternating field of constant effective amplitude and steady frequency.

The invention will be more fully understood from the following description read in conjunction with the accompanying drawings in which:

Fig. 1 is a schematic diagram illustrating one type of a novel borehole induction calipering device;

Fig. 2 is a schematic diagram of a second embodiment of the caliper associated with an electrical logging instrument;

Fig. 3 is a perspective view of a modified portion of the caliper shown in Fig. 2 and Figs. 4 and 5 are schematic diagrams illustrating two embodiments of the caliper shown in Fig. 2.

Referring to Fig. 1, one type of calipering instrument embodying the present invention is designated generally by the numeral 10 and is shown positioned in a borehole 11 containing an electrically conductive column of drilling mud 9. The instrument 10 is arranged to be moved along the borehole 11 by a supporting cable 12 connected in the usual manner to a drum and winch arrangement (not shown) at the surface of the earth.

The calipering instrument 10 may include an elongated housing 13 from the ends of which pairs of bowed spring arms 14, 14', and 15, 15' project transversely of the borehole 11 in opposite directions. As shown in Fig. 1, arms 14, 14' support a small wheel 16 and arms 15, 15' support a pad 17 on either side of the central housing 13 in such manner as to urge the pad 17 and the wheel 16 against opposite walls of the borehole 11. The pad 17 may include electrodes for measuring electrical characteristics of the adjacent formations or merely serve as a balancing element to maintain the housing 13 substantially centered in the borehole 11.

The wheel 16 is disposed in a plane including the axis of the housing 13 and is arranged to be rotated about a normally horizontal axle 20, which is journaled in a cup-shaped member 30 fixed to the adjacent ends of the arms 14, 14', by rolling against the wall as the housing 13 is raised along the borehole. Mounted on the wheel 16 is a small bar-shaped permanent magnet 18 having its north pole N and south pole S disposed at diametrically opposite points on the wheel.

Located within the center portion of the housing 13 at a point substantially opposite the wheel 16, is a small electrical coil 19 having one end grounded to the housing 13 and the other end coupled by a conductor 21, which passes through the cable 12, to a recording or indicating instrument 26 outside the borehole. The external apparatus may include an amplifier 22, a frequency compensator 23, a detector 24, and a linearizing circuit 25 connected in series and preceding the instrument 26. The functions of the frequency compensator 23 and the linearizing circuit 25 will become clear as the description proceeds.

In operation, the calipering instrument 10 is lowered by the cable 12 to the bottom of the borehole 11 and then raised, preferably at a constant speed, thereby causing the wheel 16 to roll along the wall of the borehole 11. As the wheel 16 is continuously urged against the wall by the arms 14, 14' it will follow variations in the diameter of the borehole 11 and move toward or away from the coil 19 in the housing 13. Rotation of the wheel 16 causes rotation of the magnetic field established by the magnet 18 and subjects the coil 19 to an alternating magnetic field which induces an alternating voltage in the same. This voltage is conducted to the surface, amplified by the amplifier 22, compensated for variation in logging speed by the frequency compensator 23, rectified by the detector 24, non-linearly amplified in the linearizing circuit 25, and recorded by the indicating instrument 26.

The amplitude of the voltage induced in the coil 19 depends principally upon the speed at which the wheel 16 rotates, and the distance between the wheel 16 and the coil 19, which latter factor is a function of the borehole diameter. Clearly, if the instrument 13 is raised at a constant speed, all amplitude variation due to the first factor is eliminated, and amplitude variations in the signal at the indicator 26 will be a function of the borehole diameter only. Under these circumstances the frequency compensator 23 is superfluous.

Experiment and theory indicate that the amplitude of the voltage induced in the receiver coil 19 varies inversely as the cube of the distance between the coil and the wheel 16 when both remain in a common plane. This inverse variation can easily be converted to a linear relationship by a corresponding non-linear amplification in the linearizing circuit 25. It should be understood, of course, that other linearizing means can be employed such as distorting optical lenses in a galvanometer type recording instrument or non-linear mechanical restoring springs in the galvanometer itself. Furthermore, it will be clear that the signal may be made proportional to the cross-sectional area of the borehole by suitable non-linear amplifying circuits. The fact that the initial signal varies inversely as the cube of the distance between the wheel 16 and the coil 19 results in an advantageously large variation in the induced voltage for very small variations in diameter in the case of small boreholes.

When the instrument 10 is not withdrawn from the borehole at a constant speed, both the frequency and the amplitude of the signal induced in the coil 19 vary. However, since the amplitude variation is a direct function of the frequency variation, correction thereof is readily effected by a simple frequency discriminating circuit in the frequency compensator 23 which attenuates the applied signal in proportion to its frequency. This circuit may take the form of resistance-capacitance network. Measurement of the frequency of the signal applied to the compensator 23 will give an indication of the regularity of movement of the instrument 10 in the borehole.

The indicating instrument 26 may be of the galvanometer recorder type in which case the output signal from the linearizing circuit 25 will be recorded on a film. The amplitude variations in such recorded log are directly proportional to the diameter of the borehole. Alternatively, the linearizing circuit 25 may include non-linear elements yielding a signal proportional to the square of the diameter and hence directly proportional to the cross-sectional area of the borehole. It should be understood, of course, that the linearizing circuit 25 may be eliminated by providing appropriately scaled indicia on the log produced by the instrument 26 enabling the same to be read directly in terms of diameter or area.

Alternative means may be utilized for rotating the permanent magnet 18. For example, the wheel 16 can be provided with turbine type blades such that withdrawal of the instrument 13 through the borehole mud column 9 will effect rotation of the wheel. It is sufficient that the magnetic field should appear to fluctuate as measured at the receiver coil 19. Accordingly, the permanent magnet 18 may be oscillated or reciprocated to provide suitable field fluctuation.

Fig. 2 discloses a modified form of the embodiment of Fig. 1 wherein the small wheel 16 is replaced by a transmitting coil 27 having its axis directed towards the center of the housing 13. In place of the receiving coil 19 of Fig. 1, there is provided a flat-wound receiving coil 28 coaxial with the transmitting coil 27.

An alternating current source 29 located at the surface of the earth supplies current to the transmitting coil 28 by way of a direct current blocking capacitor 31, a conductor 32, which passes through the cable 12, a further capacitor 33 in the housing 13, and a conductor 34.

An electrical logging system similar to that disclosed in applicant's copending application Serial No. 122,102, filed October 18, 1949, and entitled "Resistivity Method and Apparatus for Obtaining Indications of Permeable Formations Traversed by a Borehole" is illustrated in combination with the calipering apparatus. As shown in Fig. 2 the housing 13 in cooperation with the arms 15, 15' and the pad 17 supports a set of electrodes A, M, and M'. The electrodes are arranged to press against the wall of the borehole and are connected by conductors 35 which pass through the cable 12 to surface equipment 36. Since alternating current is transmitted down the borehole from the surface equipment 36 to the current electrode A during operation of the electrical logging apparatus, an alternative source of alternating current for the transmitting coil 27 is available. For example, the coil 27 can be connected directly in series between the conductor supplying current to the electrode A and the electrode A itself.

In order to operate the caliper with only a single electrical conductor running the length of the borehole, the signal induced in the receiving coil 28 is amplified and rectified within the housing 13 and transmitted as a direct voltage over the conductor 32 to the surface of the earth. For this purpose, an amplifier 38 and a detector 39 are connected in series between the coil 28 and the conductor 32 and are enclosed in the housing 13. Blocking capacitors 31 and 33 keep the direct voltage from the alternating current source 29 and the coil 27, respectively.

Where the alternating current source 29 is employed separate from the current source which energizes the electrode A, it is desirable to choose different frequencies for the two current sources. Filters can then be associated with the indicating circuits to eliminate any possible interference between the electrical logging system and the calipering apparatus.

The surface equipment of the caliper of Fig. 2 need only comprise the linearizing circuit 25 and the indicator 26, since the amplifier 38 and the detector 39 are located in the housing 13 rather than at the surface and no frequency compensating circuit is required.

The operation of the caliper in the embodiment of Fig. 2 is similar to that of Fig. 1 except that variations in amplitude of the voltage induced in the receiving coil 28 depend only upon the spacing between the coils 27 and 28 and not on the rate of movement of the instrument 10.

In Fig. 3 the receiving coil 28 is enclosed within a container 41 which is adjustably mounted to the exterior of the housing 13. A clamp 42 secures tubular supports 43, 43' to opposite sides of the housing 13 perpendicularly to the axis thereof. Rods 44, 44' are fastened to the container 41 and are telescopically slidable within the tubular supports 43, 43', respectively. Bolts 45 may be provided to clamp securely the rods 44, 44' within the tubular supports 43, 43' by passing through openings 46 in the respective rods.

With this construction, the coil 28 may be clamped to the housing 13 of an electrical logging instrument, for example, and spaced as close to the transmitting coil 27 as desired. The initial separation will in practice, be governed by the minimum borehole diameter. Thus, the coil 28 will be adjusted to be substantially adjacent the coil 27 when the distance between the coil 27 and the axis of the housing 13 is equal to one-half the minimum diameter of the borehole. This spacing will render the coil 28 most sensitive over the entire range of the borehole diameter logged. Large variations in the signal induced in the coil 28 will result from slight changes in the borehole diameter because of the inverse cube relationship between the induced signal and the coil separation.

Clearly, the transmitting coil 27 could be adjustably mounted rather than the receiving coil 28. Moreover the adjustable feature illustrated in Fig. 3 is equally adaptable to the receiving coil 19 of Fig. 1.

It will now be appreciated that the present invention provides a particularly rugged and simple caliper instrument for measuring the transverse dimensions or cross-sectional areas of boreholes. Complicated mechanical linkages between arms 14, 14' and cooperating movable parts in the housing 13 are dispensed with. Furthermore, there is no danger of inaccuracies in measurements as a result of inaccurate movement of the ends of the spring arms along the housing 13, since the recorded signal depends on the distance between the coils and not on the extent of other movement mechanically communicated by the arms.

The present calipering instrument is seen to be readily adapted to ordinary logging instruments which employ arms in engagement with the wall of the borehole, by simply fastening the magnetic field generating means and the receiving coil, one on one of the arms and the other on the central housing.

It should be understood, of course, that the relative positions of the transmitting and receiving coils in Fig. 2 can be interchanged without affecting the operation of the system. Moreover, as shown in Fig. 4, the transmitting coil 27 can be mounted in a chamber 17a directly on the back of the electrical logging pad 17 rather than attached to the opposite spring arms 14, 14'. A pad 17' urged against the wall of the borehole by the springs 14 and 14' is employed to center the housing 13.

Alternatively, as illustrated in Fig. 5, the receiving coil 28 can be mounted in a chamber 17b on the pad 17 and joined to the housing 13 by a conductor 38', the transmitting coil 27 remaining positioned as shown in Fig. 2. This arrangement eliminates any coil mounting on or in the housing 13. Obviously, it is not necessary that the coils 27 and 28 be coaxial in the above-described embodiments of the invention. They can be mounted, for example, in separate horizontal planes with their axes parallel to the borehole axis. In this case the coil 28 can be wound around the outside of the housing 13.

Further modifications of the various components within the concept of the present invention will occur to those skilled in the art; consequently the particular embodiments illustrated are not to be deemed as limiting the adaptability or uses of the invention except as restricted by the appended claims.

I claim:

1. Apparatus for measuring variations in a transverse dimension of a borehole traversing earth formations comprising transmitting means, first means cooperating with said transmitting means for generating in the vicinity thereof a fluctuating magnetic field, said first means being operable to predetermine the frequency of said fluctuations, receiving means responsive to said magnetic field for generating an electrical signal, a first member directly mounting one of said transmitting and receiving means, a second member directly mounting the other of said transmitting and receiving means, supporting means carrying said first and second members and adapted to move along the axis of the borehole, said supporting means including resilient means for biasing said members apart and adapted to urge at least one of said members against the wall of the borehole to vary the inductive coupling between said transmitting and receiving means in response to variations in said transverse dimension of the borehole, and means for indicating variations in said transverse dimension in response to the electrical signal generated in said receiving means.

2. Apparatus according to claim 1 wherein the magnetic field generating means comprises a transmitting coil energized from a power source.

3. Apparatus according to claim 1 wherein the magnetic field generating means comprises a permanent magnet.

4. Apparatus according to claim 1 wherein the magnetic field generating means comprises a permanent magnet fixed to a wheel supported by the first member and forced into rolling contact with the wall of the borehole.

5. Apparatus for measuring a transverse dimension of a borehole traversing earth formations comprising transmitting means for generating an alternating magnetic field at a predetermined frequency, receiving means for generating an electrical signal induced in response to the magnetic field, an arm directly supporting one of said transmitting and receiving means and adapted to be resiliently urged against the wall of the borehole, a central housing adapted to be axially moved in the borehole, said housing supporting the other of said transmitting and receiving means for movement relative to said arm in a direction transverse to the axis of the borehole in response to variations in said transverse dimension of the borehole, and means for indicating said transverse dimension in response to the electrical signal induced in said receiving means.

6. Apparatus according to claim 5 wherein a detachable mounting is provided for securing said other of said transmitting and receiving means to the exterior of the central housing, said mounting being adjustable transversely of the borehole axis to alter the initial spacing between the transmitting and receiving means.

7. Apparatus according to claim 5 wherein means are provided for non-linearly modifying the electrical signal induced in the receiving means to compensate at least partially for the non-linear relationship between the amplitude of the induced signal and the spacing between the transmitting and receiving means in a direction transverse of the borehole axis.

8. Apparatus for measuring a transverse dimension of a borehole traversing earth formations comprising a transmitting coil energized by alternating current for generating an alternating magnetic field, a receiving coil for generating an electrical signal induced by the alternating field, a unitary element rigidly mounting one of said coils, a central member adapted to be axially moved in the borehole supporting the other of said coils, resilient means for coupling said element to said member and adapted to urge said element against the wall of the borehole, and means responsive to the electrical signal induced in said receiving coil for indicating said transverse dimension of the borehole.

9. Apparatus according to claim 8 wherein a detachable mounting is provided for securing said other of said coils to the exterior of the central member, said mounting being adjustable transversely of the borehole axis to alter the initial spacing between the transmitting and receiving coils.

10. Apparatus according to claim 8 wherein means are provided for non-linearly modifying the electrical signal induced in the receiving coil to compensate for the non-linear relationship between the amplitude of the induced signal and the spacing between the transmitting and receiving coils in a direction transverse of the borehole axis.

11. Apparatus for measuring the diameter of a borehole traversing earth formations comprising a permanent magnet rotatable by movement of the apparatus through the borehole for generating an alternating magnetic field, a receiving coil for generating an electrical signal induced in response to the magnetic field, an arm supporting said permanent magnet and adapted to be resiliently urged against the wall of the borehole, a member supporting said receiving coil for movement relative to said arm in a direction transverse to the axis of the borehole in response to variations in the diameter of the borehole, and means responsive to the electrical signal induced in said receiving coil for indicating the diameter of the borehole.

12. Apparatus according to claim 11 wherein means are provided for non-linearly modifying the electrical signal induced in the receiving coil to compensate for the non-linear relationship between the amplitude of the induced signal and the spacing between the axis of rotation of the permanent magnet and the receiving coil in a direction transverse of the borehole axis.

13. Apparatus according to claim 11 wherein means are provided for modifying the amplitude of the signal induced in the receiving coil in inverse relationship to the frequency of said signal, whereby the indicated measurement is rendered substantially independent of the rate of movement of the appaartus through the borehole.

References Cited in the file of this patent

UNITED STATES PATENTS

| | | |
|---|---|---|
| 2,281,960 | Vacquier | May 5, 1942 |
| 2,299,406 | Potter | Oct. 20, 1942 |
| 2,459,499 | Castel | Jan. 18, 1949 |
| 2,503,851 | Snow | Apr. 11, 1950 |
| 2,534,632 | Smith | Dec. 19, 1950 |
| 2,649,786 | Goble | Aug. 25, 1953 |

OTHER REFERENCES

Publication: Product Engineering, Jan. 1948. Article entitled: "Electronic Micrometer Uses Dual Coils," pages 134–136.